United States Patent [19]
Doak et al.

[11] Patent Number: 5,864,869
[45] Date of Patent: Jan. 26, 1999

[54] METHOD AND MANUFACTURE OF LESSON PLANS AND CLASSROOM ORGANIZERS UTILIZING COMPUTERS AND SOFTWARE

[76] Inventors: Ron K. Doak, P.O. Box 216; Suzanne L. King, Box 216, both of Pearland, Tex. 77588-0216

[21] Appl. No.: 683,085

[22] Filed: Jul. 18, 1996

[51] Int. Cl.⁶ .................................................. G06F 17/30
[52] U.S. Cl. .......................................... 707/104; 707/500
[58] Field of Search ................................. 707/104, 507, 707/508, 500, 1

[56] References Cited

U.S. PATENT DOCUMENTS

| | | | |
|---|---|---|---|
| 4,820,167 | 4/1989 | Nobles et al. | 434/336 |
| 5,173,051 | 12/1992 | May et al. | 434/118 |
| 5,176,520 | 1/1993 | Hamilton | 434/350 |
| 5,267,865 | 12/1993 | Lee et al. | 434/350 |
| 5,327,341 | 7/1994 | Whalen et al. | 705/3 |
| 5,385,475 | 1/1995 | Sudman | 434/118 |
| 5,448,729 | 9/1995 | Murduck | 707/104 |

OTHER PUBLICATIONS

Brooks, S. "Hypercard 2.0 and the Educator HomeCard" Technology & Learning, V11, No. 5, p 18MAC(2), Feb. 1991.

Kinnaman, D. "Apple introduces Hypercard and the all new HomeCard" Technology & Learning V11, No. !, pp. 84 (1), Sep. 1990.

Pepper, J. "Blankity Blank fills out word–processor forms." PC Week, V5, No. 2, pp. 81 (2), Jan. 1988.

*Primary Examiner*—Thomas G. Black
*Assistant Examiner*—Jack M. Choules

[57] ABSTRACT

Software utilizing a system and methodologies that allow cross-platform data transfer, either single user and/or networked access, for creating and maintaining an integrated classroom organizer using a computer. The user can create a year of detailed lesson plans. The user enters the number of pages of text(s), or quantified teaching block broken into percentage of completion, in a specified teaching period be it the entire year, semester, month, etc. The text(s) pages or percentage of a teaching task are allocated to designated teaching days previously identified in the calendar. The user can edit and determine whether the pre-scheduled number of text(s) pages, or percentage of a teaching task has been completed, by merely inputting the text(s) page or percentage completed. The difference between text(s) pages or percentage of task completed and the text(s) pages or percentage of task completion previously planned by user will match or not. If not, the software reallocates the difference and prompts user to adjust text(s) or teaching task progress. The software program is calendar driven and utilizes a relational database with calculations, scripts, and routines that allow the user to enter all elements required to create daily, weekly or monthly lesson plans; syllabi; seating charts; grades; attendance; progress reports; and student/parent letters. The software allows users to export and import software data to another computer. All data can be archived or copied to the next year for use and revision as deemed necessary by user.

15 Claims, 6 Drawing Sheets

METHOD AND MANUFACTURE OF LESSON PLANS AND CLASSROOM ORGANIZERS UTILIZING COMPUTERS AND SOFTWARE

TECHNICAL FIELD

This invention is generally related to the educational field and the method and process of creating, editing, and the production of classroom specific and non-specific lesson plans and classroom organizers.

BACKGROUND OF THE INVENTION

Teachers are required to prepare daily lesson plans on at least a weekly basis. Lesson plans are written directions that are prepared so a teacher has a teaching strategies and procedures for presenting the educational information via lessons and class curriculum required per their individual school policies and procedures. In most schools, the lesson plan is required to be available in the classroom, presented to the department head and in some instances, also made available to the school principal.

Classroom teachers have many duties, not the least being, creating and working with considerable amounts of non-teaching paperwork. Paperwork that includes creating, maintaining and publishing daily and weekly lesson plans. Lesson plans usually require the listing of the school, teacher, date, subject, time of class period, subject matter to be taught, and the teaching method to be utilized. In addition, it may list the necessary tools and/or materials required to teach that day. Also, special programs and/or activities may be listed.

Teachers have used pre-printed lesson plan forms and/or purchased pre-printed lesson plan booklets to provide them with the basic form(s) on which they develop the basic outline of the hourly and daily curriculum, materials and method(s) of instruction. Some preprinted forms provide for the teacher to manually insert the necessary curriculum, materials, and methods of teaching in a pre-determined but limited space. The pre-printed lesson plan booklets include pages for manual recording students names, addresses, personal data, parent and emergency information, grades, school and class curriculum, district and/or school holiday or in-service days as well as the pre-printed pages on which to develop the daily and weekly lesson plan(s).

Teachers must implement the teaching source materials and class curriculumas prescribed by their individual school, district and/or state education departments. Along with the school year schedule, teachers calculate their individual per hour/day/week teaching methods and materials, including text books and other educational resources and create a lesson plan. The purpose of the mandated lesson plan is to give direction to the classroom teacher so that the required materials used with curriculum, procedure, and methodology properly followed and completed. The lesson plan is also used to enable a substitute teacher to conduct the class and complete the prescribed lessons, procedure, methodology, curriculum, and materials as if the regular teacher was present.

Federal and state holidays are usually blocked on any pre-printed lesson plan form but individual district and/or school holidays and non-teaching in-service dates must be manually entered onto the lesson plan for publication.

Integrated word processing, data base and spread sheet software programs, such as Claris Works™, provide computer literate teachers with a tool for manually designing individual class grade books, student rosters and even rudimentary lesson plans. There are also some computer software programs, such as "Teachers Toolbox"™, available that supply the teacher with some computer generated templates onto which the teacher must enter the necessary information on a weekly basis. Current lesson plan software merely supplants the need to hand enter the information using conventional writing tools.

The intent of this invention is to provide a generic as well as a specific lesson plan format generator, editor and publisher. Additionally, it includes a totally integrated classroom organizer, process, and manufacturer providing the teachers with the required lesson plan that reduces or eliminates the use of conventional writing tools. The integration feature of this invention also saves teachers' time by eliminating redundant and duplicate entries into multiple manual records.

There are numerous inventions detailing the creation of subject-specific lesson plans and/or multi-media collection of audio-visual materials that are assimilated into computer generated teaching methods and subject-specific course outlines and subject-driven lesson plans. U.S. Pat. No. 5,173,051 details a method and system of utilizing an information source to select, recall, order and translate subject-specific materials to an information repository (student). The information source(s) stated are listed are video-disks and CD-ROM's but may be any other type of information source, i.e. computer hard drives, storage tapes and/or floppy disks or even internet educational resources.

U.S. Pat. No. 5,176,520 details a computer assisted instructional information delivery system but limits its treatise to two or more stations and the utilization of a network communication system.

U.S. Pat. No. 5,385,475 details a system and method of connecting audiovisual output signals from audiovisual resources to develop, process, switch, and store selected audiovisual data for eventual selection and presentation and/or playback in specific lesson plan form for use on a monitor or on a network system.

SUMMARY OF THE INVENTION

The subject invention provides a process for developing, creating, editing and maintaining generic and subject-specific lesson plans, grade sheets, personal information and other classroom information and the means of manufacturing generic and subject-specific lesson plans, grade sheets, classroom information and personal information publications. The invention employs the (1) use of a computer, (2) the computer's data storage facilities, and (3) a printing device for publication. The equipment will enable the user to input data that will be manipulated by the invention's programming, save the information and then retrieve and publish the information when requested. Order: Input; save; manipulate; retrieve; publish.

The invention utilizes a relational database to enter and maintain data that is then processed to create, edit and publish generic and subject-specific lesson plans, grade sheets, student personal, class, and school information.

The invention software operates in a GUI (Graphic User Interface) environment allowing the user to use point and click (mouse) technology in all aspects of its operations and functions.

Teachers, utilizing this invention, can input an entire years text(s) and have the computer allocate proportionate number of sections, chapters, and/or pages to all the days not previously blocked as non-teaching days. The teacher would then merely edit their program at the end of each week by responding to the query, "What page did you last complete?" The resultant response would either correspond to the planned week's completion or cause the program to adjust the rest of the year's required text(s) pages up or down so that the entire text(s) would be completed by years end.

The process of entering the total number of pages per text to be covered for the year, in each class, for each subject, at the beginning of the year and allowing the computer program, along with the computer's processing unit, to update the entire remaining year's required pages would reduce the amount of weekly lesson plan work the teacher would have to manually perform. Weekly editing would allow the teacher to maintain a desired pace of completion in every class and on a pre-determined completion program.

DETAILED DESCRIPTION OF THE PREFERRED EMBODIMENTS

This invention will give individual teachers the advantage of creating monthly or weekly lesson plans detailing what will be taught utilizing available computers instead of developing this mandatory weekly teaching tool by hand.

Figure 1:
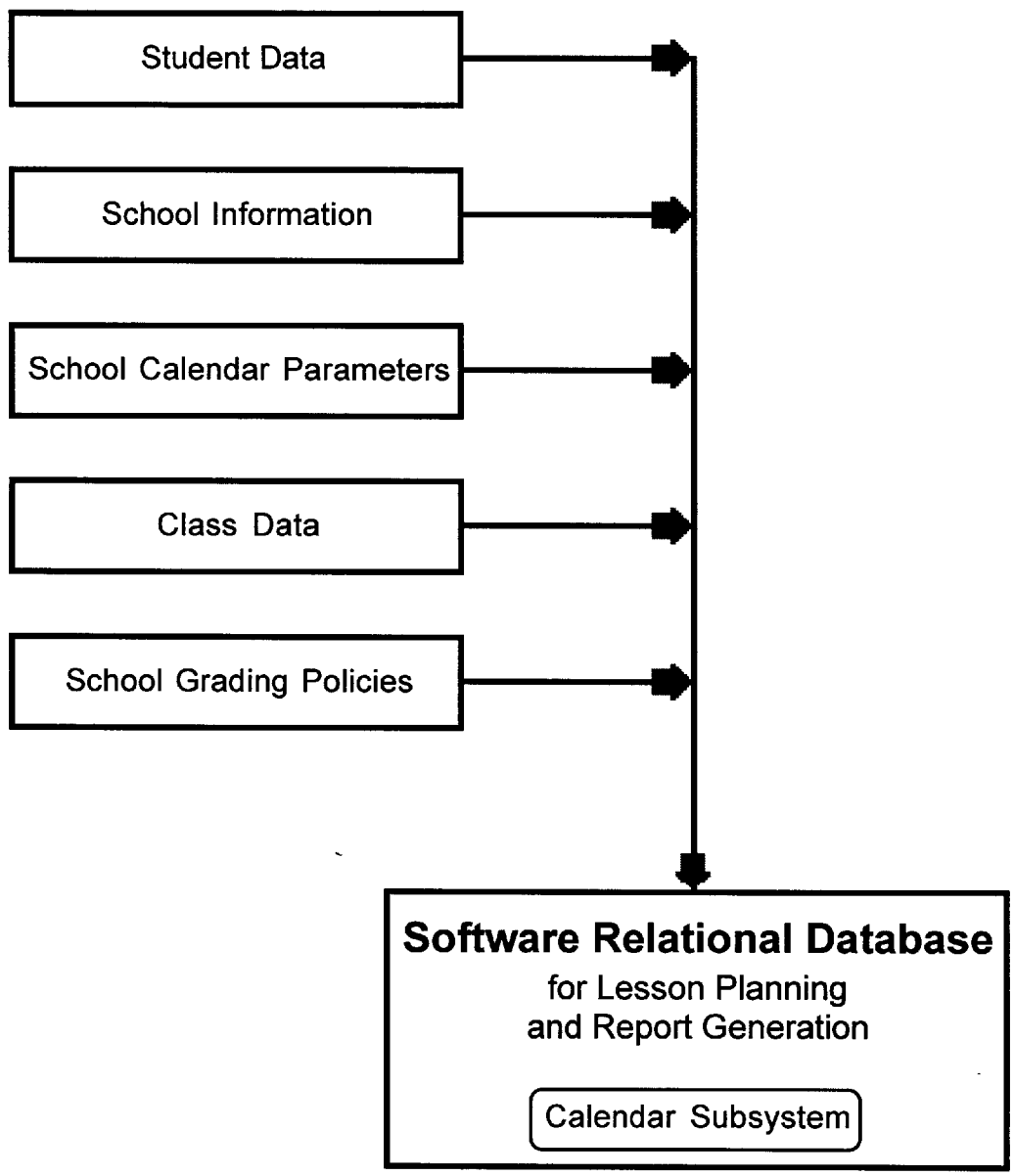
FIG. 1 is a flow diagram illustrating the data options, by general category, which can input centrally into the software manually or by electronic means from or by a school or school district.

This invention is designed so the school or school district (or other central administrative unit) can enter or transfer by import procedures and processes included in this program pertinent information on the school, student roster, guardian and medical information, curriculum, holidays, non-teaching, in-service training days, as well as all other school-wide information. It does not have to be re-entered by user. FIG. 1.

Figure 4:
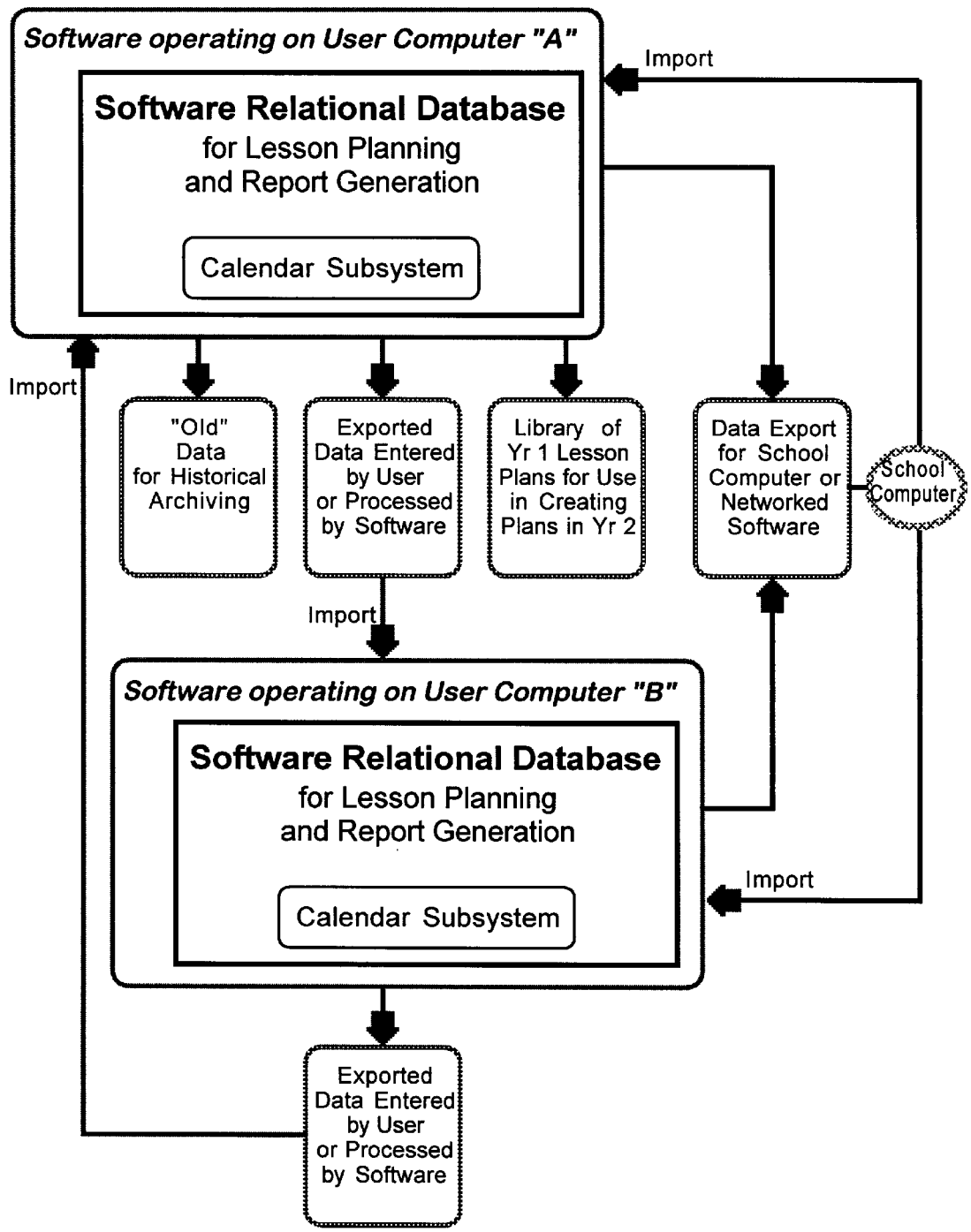
FIG. 4 depicts the import and export processes supported by this software. While import and exporting data is not unique in software, it is the automated nature of the procedures included in this invention that are notable. These processes allow the user to work on multiple computers, work from different locations, for multiple users to share common data, and for a single user to provide data that is available for access by multiple users (other teachers, school administrators). The combination of export and import processes are a critical function of this Software's increased utility to the user. The transportability of the data produced by this invention between platforms (PC—Macintosh) is unique and is not addressed by the references listed by examiner.

Utilizing the software's relational database with the calendar as a critical subsystem, the user can select the individual student for a specific class and have all the student's pertinent information immediately available to them. This invention's capability for networking would allow a centrally located system to import date parameters as well as global school data that would be pertinent to the individual user without them having to also re-enter the data themselves. This would insure initial data consistency and integrity by using one master dataset for all teachers in a grade and/or school. The invention also allows for manual data input should an import from a central computer or server not be available or usable. FIGS. 1 and 4.

Figure 2:
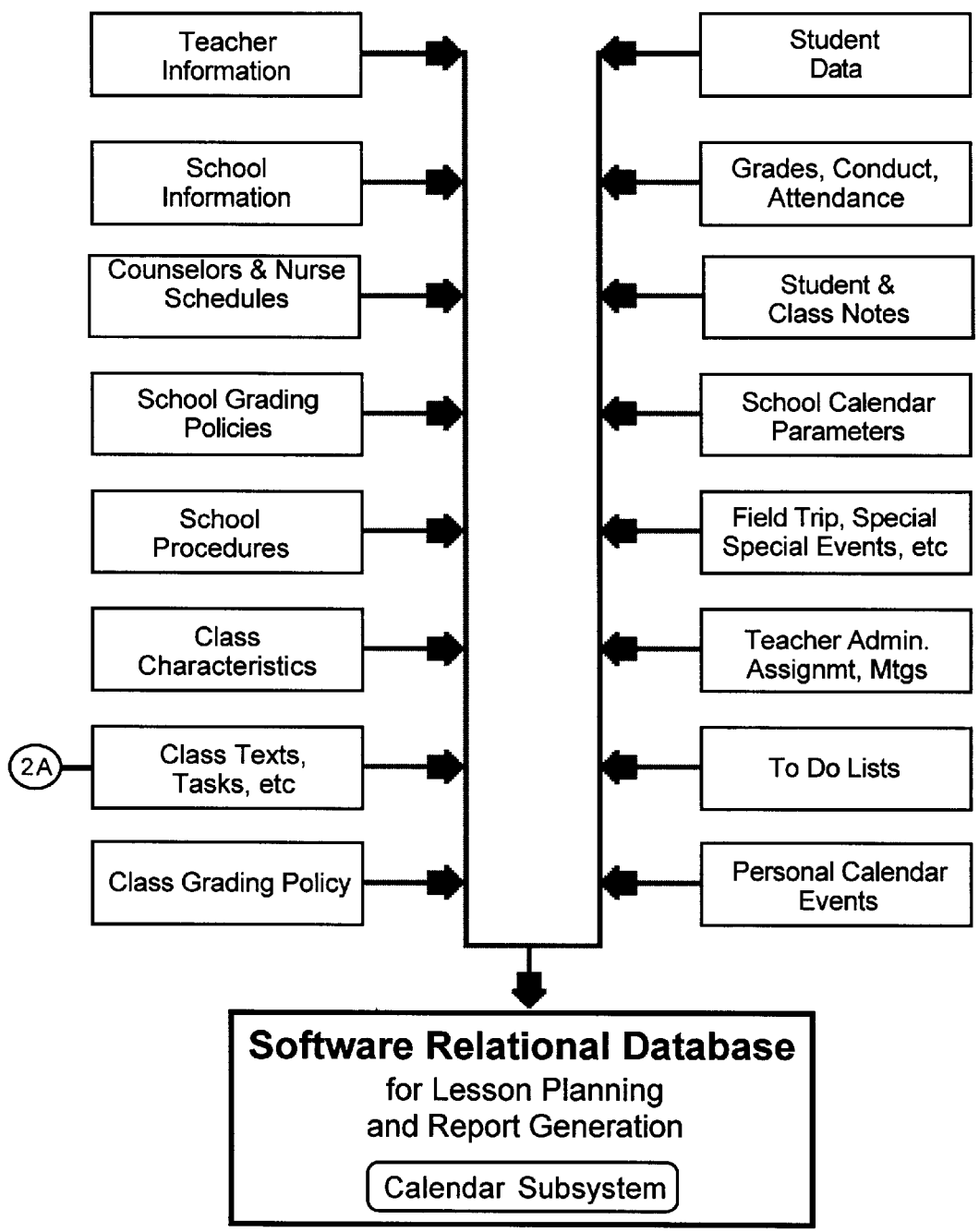
FIG. 2 shows data categories entered by the user (teacher or school) into the software utilizing this patent's software processes to generate a variety of outputs, electronic and printed.
Figure 2A:
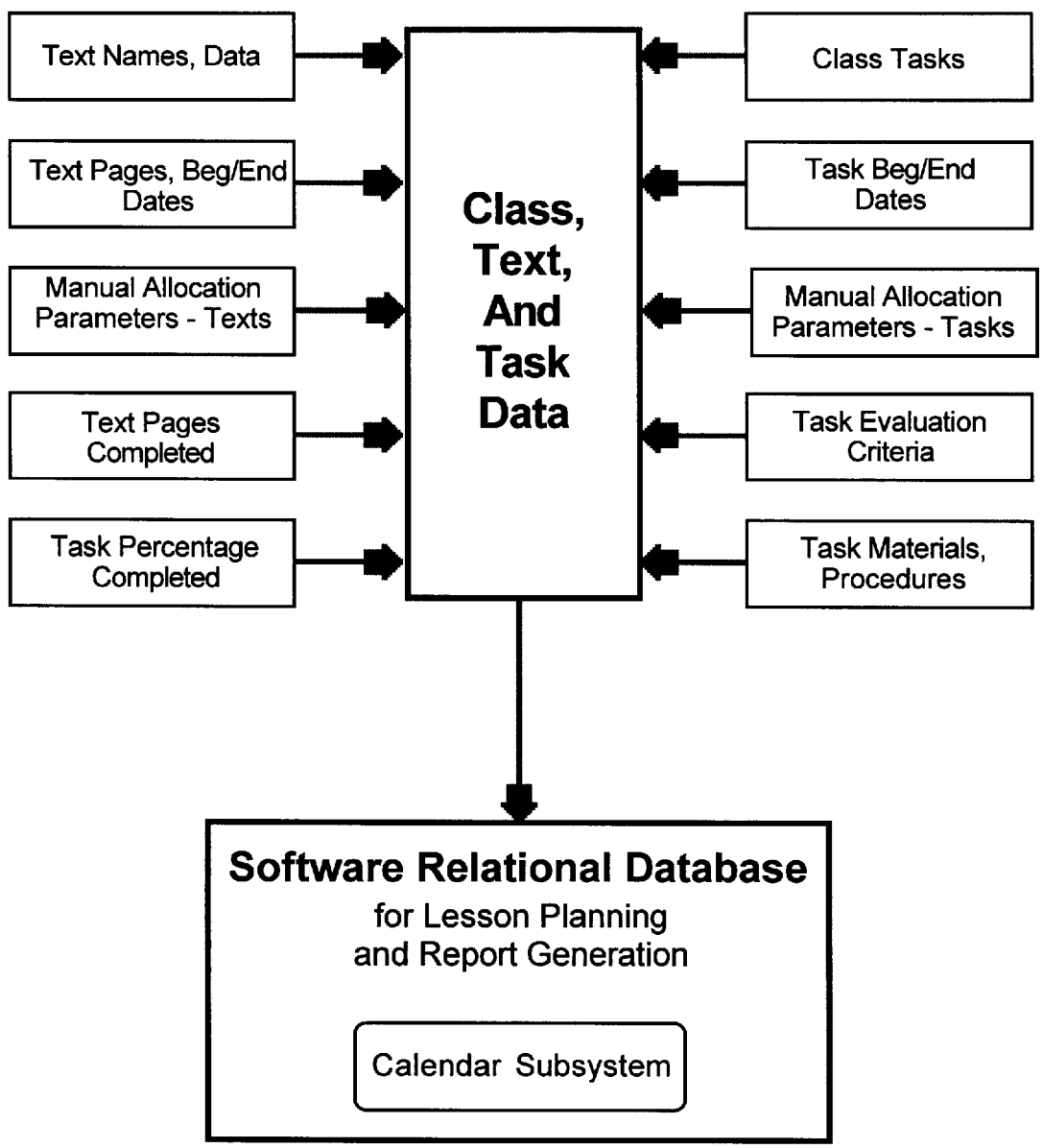
FIG. 2A details the data elements supplied by the user for the class, text and task components. These data elements are required for the text(s) task allocation features of this invention's software and to produce daily lesson plan documents.

The invention enables a teacher to enter text(s) or teaching task(s) of each class to be taught; the number of pages in the text(s); or the quantified teaching block to be taught in the selected teaching task or period; percentage of completion of teaching task; the length of teaching period (i.e. year, semester, quarter, month, week, day, etc.); the starting and ending date of each teaching task or period; the required and/or suggested materials to be used; the methodology to be used in the teaching of that teaching task or period; the projected objective(s); and the evaluation to determine the success. FIGS. 2 and 2A.

Figure 3:
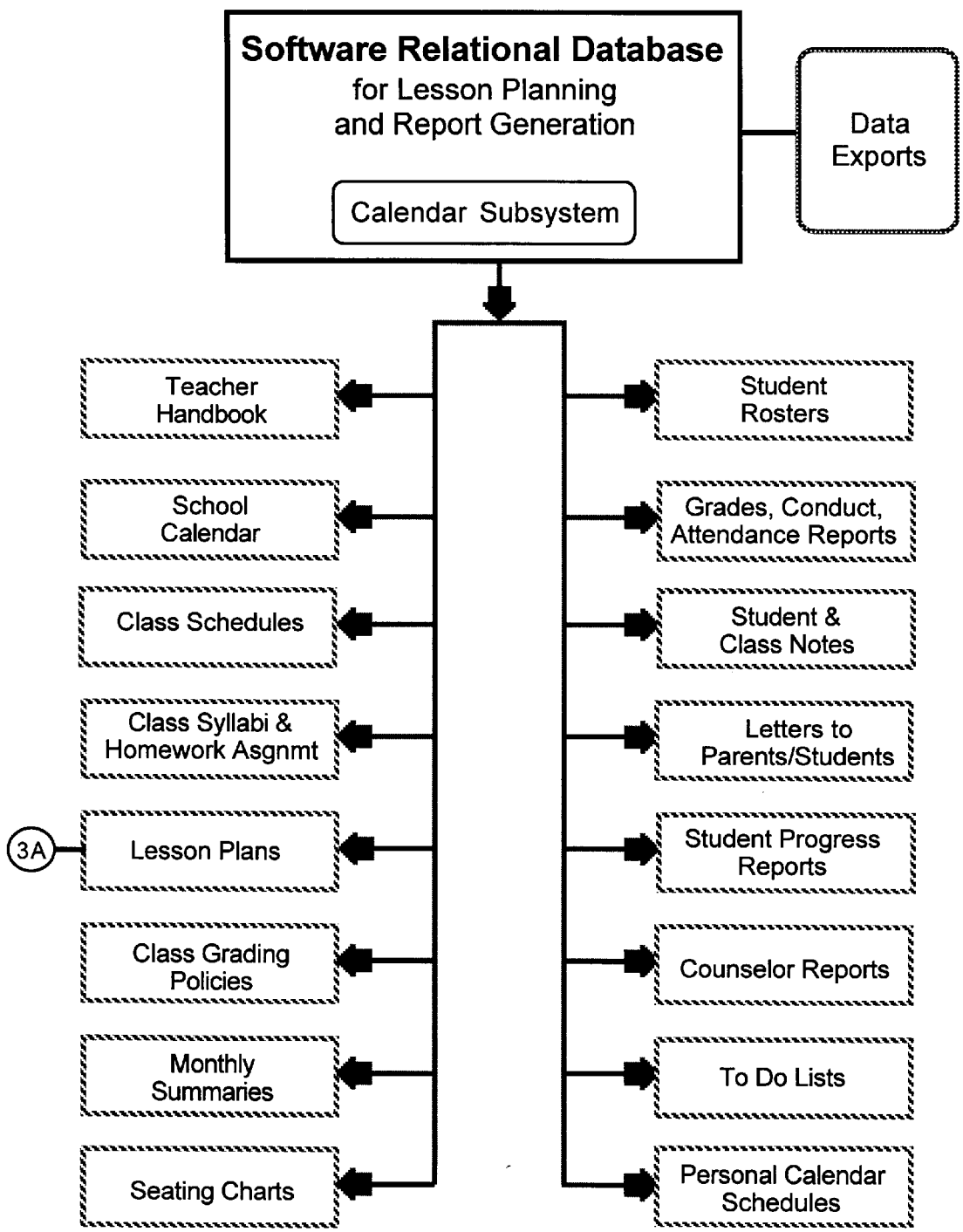
FIG. 3 details a sample of output created utilizing this software's processes and the calendar subsystem. The user can continually create, generate, edit, and produce weekly lesson plan summaries or outlines, class and individual grade book(s), student (classroom) rosters, class seating chart(s), syllabi and homework assignments, progress reports, and special letters and notes for the teacher, parents and students.
Figure 3A:
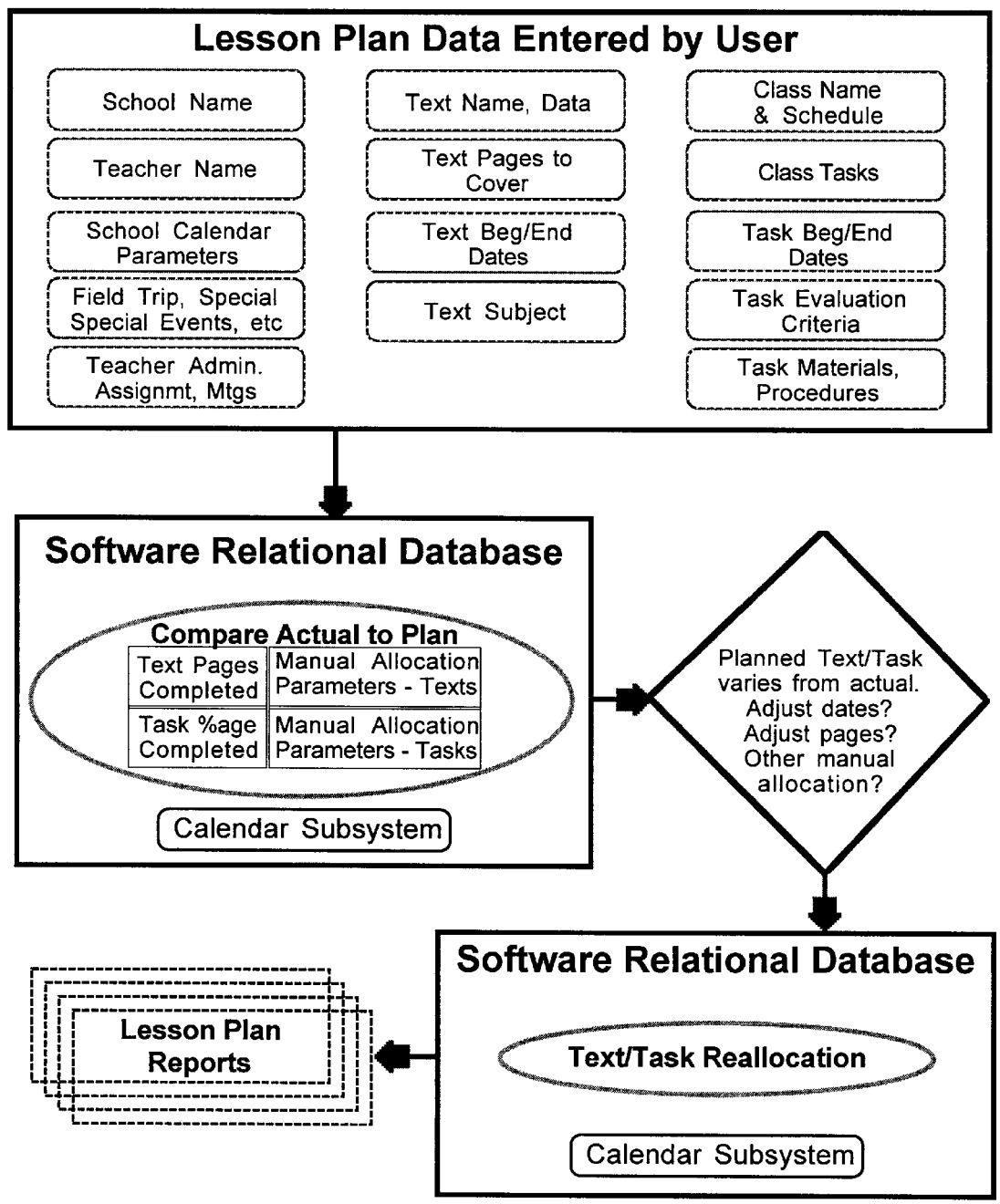
FIG. 3A illustrates the data flow of this invention's software required for the preparation of the printed weekly lesson plan reports. It illustrates the combination of data entered by the user, the software processes to compare planned achievements to actual achievements, further interactive instruction from the user, subsequent processing by this invention's software incorporating the additional instruction from the user, and producing an end-product of a printed lesson plan. This invention will allow the user to perform unlimited iterations of this process.

The computer, utilizing this software invention, allocates the number of pages or percentage of teaching task(s) to the designated teaching days and text/task allocation indicated by the user and entered into the calendar this invention's software utilizes. A teacher uses this invention's edit process at the end of each week and responds to the program's inquiry as to the page completed or task(s) completion percentage on that day. If a teaching task, or other selected teaching period, then that too can be quantified and instead of listing pages, a percentage of task completion could be used. If the pre-selected ending period corresponds to what this invention software has predetermined based on user entries as to the page number that should be completed in the teaching cycle, the user simply prints and the next week's lesson plan would be printed, ready for submission. If the planned teaching allocation of text(s) pages or task(s) differ from actual achievement (either teacher went too slowly or too rapidly), the user can enter current status and the software has the computer re-allocate the remaining pages to fit the remaining time of the determined teaching period or the user can manually enter the allocation (page number, percent of teaching task completed, etc.), or adjust the time period in which text/task is to be completed for the next teaching period (day, week or month). The user then selects print and this invention will then process the information reflecting the user's decision to either slow down or speed up instruction based on what was completed in the past week and adjusted by user. This invention gives the user the flexibility of planning an entire school year and then merely auditing progress weekly or periodically without recreating the entire lesson plan preparation and publication data entry, calculation and allocation processes. This also gives the user an ongoing review of their teaching pace and ensures that all of the required text(s) or teaching module task(s) are covered. FIGS. 3 and 3A.

This invention's ability to provide ongoing daily and/or weekly comparisons of actual plan achievement with the originally entered text(s), pages, or task(s) completion to be covered in a pre-determined period and the resultant product of a completed lesson plan reduces the teacher's weekly lesson plan work requirements to basic editing and/or entering newly released or current events to be taught. Conceivably, a teacher could enter all the necessary text(s)/task(s), and materials to be used during the teaching process, the methodology (if all classes were consistently lectured, for instance), objective(s) and expected outcome evaluations to instruct for that class and have the computer generate weekly lesson plans for the entire year that would then merely have to be edited and published as needed. FIG. 3A.

The end-product of the invention is the finished report(s) primarily being the required monthly or weekly lesson plans complete with text page allocations and the predetermined class, texts, tasks, materials, methodologies, objectives, and/or evaluation criteria. This invention gives the user a choice of lesson plan templates with which to produce and print the finished lesson plan preferred by the teacher, school, and/or district. FIGS. 3 and 3A.

With the collection of data and dates provided by the user and generated by the software, a variety of complimentary reports have been designed within the application and are available to the user for further classroom instruction management, administrative reporting needs and overall time saving for the user. In addition to the primary printed output, the weekly lesson plan, this invention also allows the user to publish: seating charts; grading schemes; teacher and parent correspondence and progress reports; class syllabi; evaluation(s). FIG. 3.

Many users utilize more than one computer, one at home and one at school, for example. The software includes processes to assist the user in transferring work completed at one computer to another computer (PC to Macintosh, etc.). The data export processes also support import functions available in other applications and on other systems, such as school server and information systems. These functions are utility in nature and available for use at the discretion of the user. FIG. 4.

The invention also allows for the user to build and save a "library" of plans. Through procedures written into the software using standard importing and exporting functions, the user can import, selected or all lesson plan and other software data, from year to year. Simple editing of data imported into the new year would ensure the user would never have to start completely from inception again. Importing and exporting routines also support archiving data for historical reference. FIG. 4.

Reading this application and the subject invention with the embodiments by those skilled in the art will give rise to other variations that should be considered within the scope and spirit of this invention. Additionally, the specifics listed should not be considered as limiting but representative of the subject invention. This invention should only be limited by the claims which follow and their equivalents.

What is claimed is:

1. A computer implemented method for planning lessons which then produces specific required reports utilizing a relational database that has been programmed to perform detailed relationship analyses comprised of:

(a) storing in the relational database school information to include holidays, non-teaching days, a student roster, classes and required class curriculum, and student information to include each students medical data and guardian, (b) developing a lesson plan for each class by:
      (i) selecting a length of a teaching period or the starting and ending date of the teaching period,
      (ii) identifying one or more texts to be used, the number of pages in a text or the number of pages to be taught, one or more teaching tasks to be taught in the teaching period, any required or suggested materials to be used in the teaching task, the methodology to be used in the teaching task, projected objectives, and an evaluation to determine the success of the teaching task, and
      (iii) allocating text pages and tasks to teaching days in the identified period;

(c) periodically editing by storing actual progress allowing the computer to compare the actual progress to the lesson plan and to correct for any deviation from the lesson plan by modifying the lesson plan by reallocating the pages and tasks;

(d) transferring information associated with one or more specific students to a second database for forming student rosters (e) storing a template that is prepared and formatted for each of the required reports; and (f) generating one of the required reports by retrieving the template prepared for the required report, processing the data and information contained in one of the databases into the template prepared for the required report, and printing the report.

2. The end of claim 1, wherein a user selects the step of allocating test pages be performed by either the computer automatically allocating an equal number of pages to be taught during each of the teaching days in the identified period or by manual entry.

3. The method of claim 1, wherein if the teaching task is quantified and can be represented by a percentage of completion the step of allocating tasks is automatically performed.

4. The method of claim 1, wherein external data and information is imported into the relational data from an external application.

5. The method of claim 1, wherein the data and information is exported for use in external applications.

6. A system for planning lessons and producing specific required reports utilizing relational database that has been programmed to perform detailed relationship analyses comprised of:

(a) storage device for storing school information to include holidays, non-teaching days, a student roster, classes and required class curriculum; and student information to include each students medical data and guardian;

(b) means for developing a lesson plan for each class by:
      (i) selecting a length of a teaching period or the starting and ending date of the teaching period,
      (ii) identifying one or more texts to be used, the number of pages in a text or the number of pages to be taught, one or more teaching tasks to be taught in the teaching period any required or suggested materials to be used in the teaching task, the methodology to be used in the teaching task, projected objectives, and an evaluation to determine the success of the teaching task and
      (iii) allocating text pages and tasks to teaching days in the identified period;

(c) means for periodically editing by storing actual progress allowing the computer to compare the actual progress of the lesson plan and to correct for any deviation from the lesson plan by modifying the lesson plan by reallocating the pages and tasks;

(d) means for transferring information associated with one or more specific students to a second database for forming student rosters;

(e) means for storing a template that is prepared and formatted for each of the required reports; and (f) means for generating one of the required reports by retrieving the template prepared for the required report, processing the data and information contained in one of the databases into the template prepared for the required report, and printing the report.

7. The system of claim 6, wherein a user selects whether the allocating of text pages be performed by either the computer automatically allocating an equal number of pages to be taught during each of the teaching days in the identified period or by manual entry.

8. The system of claim 6, wherein if the teaching task is quantified and can be represented by a percentage of completion the allocating of tasks is automatically performed.

9. The system of claim 6, including a means for importing external data and information into the relational database from an external application.

10. The system of claim 6, including a means for exporting data and information for use in eternal applications.

11. A program product embodied on a computer readable storage medium containing program code operable for planning lessons and producing specific required reports utilizing a relational database that has been programmed to perform detailed relationship analyses comprised of:

(a) program code for storing school information to include holidays, non-teaching days, a student roster, classes and required class curriculum; and student information to include each students medical data and guardian;

(b) program code for developing a lesson plan for each class by:

(i) selecting a length of a teaching period or the stating and ending date of the teaching period (ii) identifying one or more texts to be used, the nor of pages in a text or the number of pages to be taught, one or more teaching tasks to be taught in the teaching period and required or suggested materials to be used in the teaching task, the methodology to be used in the teaching task, projected objectives, and an evaluation to determine the success of the teaching task, and (iii) allocating text pages and tasks to teaching days in the identified period;

(c) program code for periodically editing by storing actual progress allowing the computer to compare the actual progress to the lesson plan and to correct for any deviation from the lesson plan by modifying the lesson plan by reallocating the pages and tasks;

(d) program code for transferring information associated with one or more specific students to a second database for forming student rosters;

(e) program code for storing a template that is prepared and formatted for each of the required reports; and (f) program code for generating one of the required reports by relieving the template prepared for the required report, processing the data and information contained in one of the databases into the template prepared for the required report and printing the report.

12. The program product of claim 11, wherein a user selects whether the allocating of text pages be performed by either the computer automatically allocating an equal number of pages to be taught during each of the teaching days in the identified period or by manual entry.

13. The program product of claim 11, wherein if the teaching task is quantified and can be represented by a percentage of completion the allocating of tasks is automatically performed.

14. The program product of claim 11, including program code for importing external data and information into the relational database from an external application.

15. The program product of claim 11, including program code for transporting data and information for use in external applications.

* * * * *